United States Patent
Okada et al.

(10) Patent No.: US 11,243,116 B2
(45) Date of Patent: Feb. 8, 2022

(54) SPECTROMETRY DEVICE AND SPECTROMETRY METHOD

(71) Applicant: YOKOGAWA ELECTRIC CORPORATION, Tokyo (JP)

(72) Inventors: Masanori Okada, Tokyo (JP); Hajime Nakamura, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/847,034

(22) Filed: Apr. 13, 2020

(65) Prior Publication Data
US 2020/0363265 A1 Nov. 19, 2020

(30) Foreign Application Priority Data

May 17, 2019 (JP) .............................. JP2019-093308

(51) Int. Cl.
*G01J 3/42* (2006.01)
*G01J 3/02* (2006.01)

(52) U.S. Cl.
CPC .............. *G01J 3/42* (2013.01); *G01J 3/0205* (2013.01)

(58) Field of Classification Search
None
See application file for complete search history.

(56) References Cited

U.S. PATENT DOCUMENTS

| | | | | |
|---|---|---|---|---|
| 3,958,122 A | * | 5/1976 | Jowett .................. | G01M 15/108 250/346 |
| 4,914,719 A | * | 4/1990 | Conlon .............. | G01N 21/3504 250/339.13 |
| 8,437,000 B2 | * | 5/2013 | Cole .................. | G01N 21/3151 356/437 |
| 2011/0317164 A1 | | 12/2011 | Cole et al. | |
| 2015/0138533 A1 | * | 5/2015 | Bolles ...................... | G01J 3/021 356/51 |
| 2017/0089829 A1 | * | 3/2017 | Bartholomew ......... | G01S 17/86 |
| 2017/0139182 A1 | * | 5/2017 | Sawyers .................. | G02B 5/10 |
| 2018/0202923 A1 | * | 7/2018 | Kageyama ............ | G01J 3/4338 |
| 2019/0101491 A1 | * | 4/2019 | Shibuya .................. | G01J 3/433 |
| 2019/0195784 A1 | * | 6/2019 | Taniguchi ................. | G01J 3/10 |
| 2019/0301939 A1 | * | 10/2019 | Medhat ................ | G01J 3/0216 |
| 2020/0049556 A1 | * | 2/2020 | Rella ........................ | G01J 3/28 |

FOREIGN PATENT DOCUMENTS

| | | |
|---|---|---|
| JP | 2015-137910 A | 7/2015 |
| WO | 2008/079032 A2 | 7/2008 |
| WO | 2016/200274 A1 | 12/2016 |

* cited by examiner

*Primary Examiner* — Shawn Decenzo
(74) *Attorney, Agent, or Firm* — Osha Bergman Watanabe & Burton LLP

(57) ABSTRACT

A spectrometry device includes a controller that: causes first irradiated light and second irradiated light to be irradiated from a first light emitter and a second light emitter at mutually different timings; stores information relating to a first light reception signal and information relating to a second light reception signal in a storage at mutually different timings, in synchronization with irradiation timings of the first irradiation light and the second irradiation light; acquires information relating to a first optical spectrum based on the information relating to the first light reception signal stored in the storage during a first time period; and acquires information relating to a second optical spectrum based on the information relating to the second reception signal stored in the storage during a second time period.

10 Claims, 10 Drawing Sheets

SPECTROMETRY DEVICE AND SPECTROMETRY METHOD

CROSS-REFERENCE TO RELATED APPLICATIONS

This application is based on and claims priority under 35 U.S.C. § 119 to Japanese Patent Application No. 2019-093308 filed on May 17, 2019, the contents of which are incorporated herein by reference.

BACKGROUND

Technical Field

The present invention generally relates to a spectrometry device and a spectrometry method.

Related Art

Conventional technologies of spectroscopically acquiring information relating to an analysis subject based on an optical spectrum such as an optical absorption spectrum are known.

For example, patent literature 1 discloses an insertion type gas-concentration measurement device that can simultaneously analyze two types of gas components of different analysis wavelengths in one device by using two light-emitting units and two light-receiving units respectively corresponding to the two light-emitting units.

Patent Literature 1: Japanese Patent Application Publication No. 2015-137910

In such a spectrometry device, depending on a disposition of the two light-receiving units, it is conceivable for two beams of light to be measured—based on two beams of irradiated light respectively irradiated from the two light-emitting units at mutually identical timings—to be received simultaneously by each light-receiving unit. At this time, if wavelength bands of photodetectors constituting each light-receiving unit mutually overlap, a reception signal of each light-receiving unit comes to also include information relating to an optical spectrum based on the other irradiated light that differs from the one corresponding irradiated light. This reduces analysis precision.

SUMMARY

One or more embodiments provide a spectrometry device and a spectrometry method that improve analysis precision even when performing spectrometry based on two beams of irradiated light.

A spectrometry device according to one or more embodiments of the present invention is provided with: a control unit, a first light-emitting unit that irradiates first irradiated light to gas to be measured, a second light-emitting unit that irradiates second irradiated light to the gas to be measured, a first light-receiving unit that outputs a first reception signal that includes information relating to a first optical spectrum of a first analysis-subject component in the gas to be measured and is obtained based on the first irradiated light, a second light-receiving unit that outputs a second reception signal that includes information relating to a second optical spectrum of a second analysis-subject component in the gas to be measured and is obtained based on the second irradiated light, and a storage unit that stores information relating to the first reception signal and information relating to the second reception signal. The control unit causes the first irradiated light and the second irradiated light to be irradiated from the first light-emitting unit and the second light-emitting unit at mutually different timings; stores the information relating to the first reception signal and the information relating to the second reception signal in the storage unit at mutually different timings, in synchronization with the irradiation timings of the first irradiated light and the second irradiated light; acquires the information relating to the first optical spectrum based on the information relating to the first reception signal stored in the storage unit during a first time period; and acquires the information relating to the second optical spectrum based on the information relating to the second reception signal stored in the storage unit during a second time period. According to such a spectrometry device, analysis precision is improved even when spectrometry is performed based on two beams of irradiated light, i.e. the first irradiated light and the second irradiated light. For example, by irradiating the first irradiated light and the second irradiated light from the first light-emitting unit and the second light-emitting unit at mutually different timings, the spectrometry device can, while executing measurement by a combination of the first light-emitting unit and the first light-receiving unit, perform spectrometry based on measurement data for which interference is suppressed by not making light to be measured based on the second irradiated light that does not correspond to the measurement incident to the first light-receiving unit. Likewise, the spectrometry device can, while executing measurement by a combination of the second light-emitting unit and the second light-receiving unit, perform spectrometry based on measurement data for which interference is suppressed by not making light to be measured based on the first irradiated light that does not correspond to the measurement incident to the second light-receiving unit.

In a spectrometry device according to one or more embodiments of the present invention, the control unit may consecutively store a plurality of pieces of information relating to the first reception signal in the storage unit during the first time period and consecutively store a plurality of pieces of information relating to the second reception signal in the storage unit during the second time period that follows the first time period. By this, because there is no need to take into consideration crosstalk and noise on circuits as in the conventional art, each constituent part can be controlled at wavelength sweeping times and the number of wavelength sweeping that are optimal for respective analyses of the first analysis-subject component and the second analysis-subject component. Therefore, a storage capacity of the storage unit is used efficiently, and the storage capacity is suppressed from being wasted.

In a spectrometry device according to one or more embodiments, the control unit may alternately store the information relating to the first reception signal and the information relating to the second reception signal every one period in the storage unit. By this, the first light-emitting unit and the second light-emitting unit alternately emit light every one period, and temperature fluctuations arising in laser elements of semiconductor lasers respectively included therein are reduced. In both the first light-emitting unit and the second light-emitting unit, times when emission is stopped are short and uniform in time domain. As such, the temperature fluctuations of the laser elements are reduced, and the temperature fluctuations of the laser elements in each period become uniform. Therefore, high-precision analysis can be realized.

In a spectrometry device according to one or more embodiments, the first light-emitting unit and the second light-emitting unit may be disposed respectively opposite to the first light-receiving unit and the second light-receiving unit with the gas to be measured interposed therebetween. By this, the spectrometry device can be configured, for example, as an opposing type, where light sources and photodetectors are separate, with the gas to be measured interposed therebetween.

A spectrometry device according to one or more embodiments may be further provided with: a probe unit that extends along optical axes of the first irradiated light and the second irradiated light to be superimposed with the gas to be measured, and a reflecting unit positioned at a tip of the probe unit to be opposite to the first light-emitting unit and the second light-emitting unit with the gas to be measured interposed therebetween. The first light-receiving unit and the second light-receiving unit may be disposed on the same side as the first light-emitting unit and the second light-emitting unit to be opposite to the reflecting unit with the gas to be measured interposed therebetween. By this, the spectrometry device can be configured, for example, as a probe type, where light sources, a reflecting structure, and photodetectors are integrally built-in.

A spectrometry method according to one or more embodiments includes: a step of irradiating first irradiated light to a gas to be measured; a step of outputting a first reception signal that includes information relating to a first optical spectrum of a first analysis-subject component in the gas to be measured and is obtained based on the first irradiated light; a step of storing information relating to the first reception signal in synchronization with an irradiation timing of the first irradiated light; a step of irradiating second irradiated light to the gas to be measured at a timing different from the first irradiated light; a step of outputting a second reception signal that includes information relating to a second optical spectrum of a second analysis-subject component in the gas to be measured and is obtained based on the second irradiated light; a step of storing information relating to the second reception signal at a timing different from a storage timing of the information relating to the first reception signal, in synchronization with an irradiation timing of the second irradiated light; a step of acquiring the information relating to the first optical spectrum based on the stored information relating to the first reception signal stored during a first time period; and a step of acquiring the information relating to the second optical spectrum based on the stored information relating to the second reception signal stored during a second time period. In the spectrometry method according to one or more embodiments, analysis precision is improved even when spectrometry is performed based on two beams of irradiated light, i. e. the first irradiated light and the second irradiated light. For example, by irradiating the first irradiated light and the second irradiated light at mutually different timings, while executing measurement based on the first irradiated light, spectrometry can be performed based on measurement data for which interference is suppressed by not detecting light to be measured based on the second irradiated light that does not correspond to the measurement. Likewise, while executing measurement based on the second irradiated light, spectrometry can be performed based on measurement data for which interference is suppressed by not detecting light to be measured based on the first irradiated light that does not correspond to the measurement.

According to one or more embodiments of the present invention, a spectrometry device and a spectrometry method can be provided that improve analysis precision even when performing spectrometry based on two beams of irradiated light.

DETAILED DESCRIPTION

Figure 1:
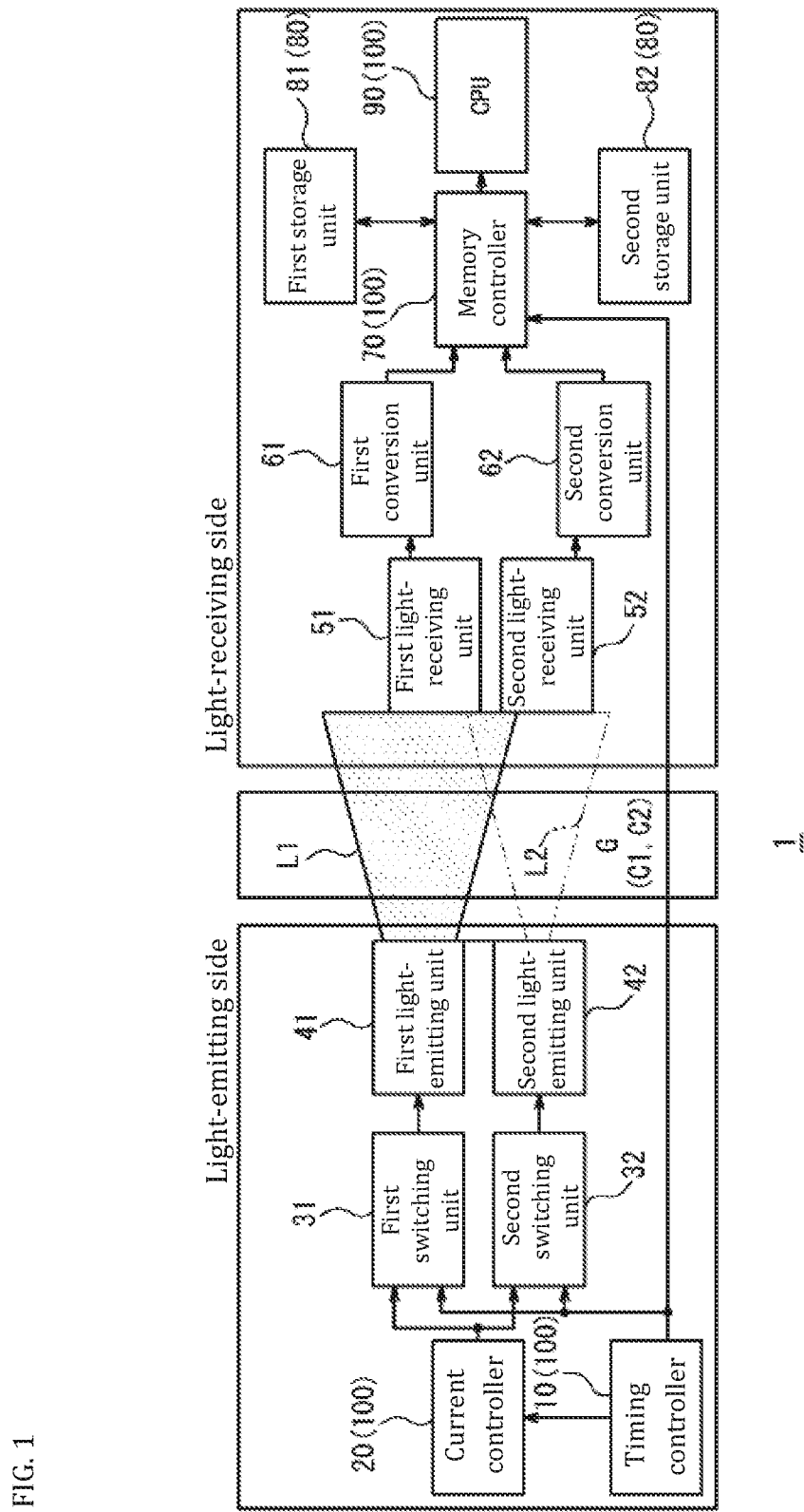
FIG. 1 is a block diagram illustrating one example of a configuration of a spectrometry device of a first embodiment.

Embodiments of the present invention will be described herein with reference to the drawings. Those skilled in the art will recognize that many alternative embodiments can be accomplished using the teaching of the present invention and that the present invention is not limited to the embodiments illustrated herein for explanatory purposes.

Generally, for example, a spectrometry device is directly installed in a flow path where gas to be measured, such as process gas, flows, and a concentration analysis of an analysis-subject component is performed. The gas to be measured includes gas molecules of, for example, CO (carbon monoxide), $CO_2$ (carbon dioxide), $H_2O$ (water), $C_nH_m$ (hydrocarbons), $NH_3$ (ammonia), and $O_2$ (oxygen). The flow path includes piping, a flue, a combustion furnace, and the like.

Such a spectrometry device includes, for example, a TDLAS (tunable diode laser absorption spectroscopy) laser gas analyzer. The TDLAS laser gas analyzer analyzes a concentration of the analysis-subject component by, for example, irradiating laser light to the gas to be measured.

The gas molecules included in the gas to be measured exhibit an optical absorption spectrum based on molecular vibration and molecular rotational-energy transitioning in an infrared to near-infrared region. The optical absorption spectrum is specific to the component molecules. According to the Lambert-Beer law, an absorbance of the gas molecules with respect to the laser light is proportional to component concentrations thereof and an optical-path length. Therefore, the concentration of the analysis-subject component can be analyzed by measuring an intensity of the optical absorption spectrum.

In TDLAS, semiconductor-laser light of a linewidth sufficiently narrower than absorption linewidths of the energy transitions had by the gas molecules is irradiated to the gas to be measured. By subjecting an injection current of a semiconductor laser to high-speed modulation, an oscillation wavelength thereof is swept. A light intensity of the semiconductor-laser light permeating the gas to be measured is measured to measure one independent optical absorption spectrum.

A sweeping range of the semiconductor-laser light differs according to application. When the analysis-subject component is $O_2$, the linewidth of the semiconductor-laser light is, for example, 0.0002 nm, and a sweep width is, for example, 0.1 to 0.2 nm. The optical absorption spectrum is measured by sweeping the sweep width of 0.1 to 0.2 nm. By performing a concentration conversion from the acquired one optical absorption spectrum, the concentration of the analysis-subject component is sought. Methods of the concentration conversion include known methods such as a peak-height method, a spectrum-area method, and a 2f method.

Generally, an oscillation wavelength of a semiconductor laser depends on an injection current and temperature of the semiconductor laser. For example, the oscillation wavelength becomes longer as the injection current increases. For example, the oscillation wavelength becomes longer as the temperature rises.

In TDLAS measurement, the temperature of the semiconductor laser is adjusted so the oscillation wavelength of the semiconductor laser roughly matches a wavelength band of an optical absorption spectrum to be measured. The temperature of the semiconductor laser is maintained at the adjusted value. Afterward, the injection current of the semiconductor laser is changed to perform fine adjustment of the oscillation wavelength.

Here, a conventional method of repeatedly sweeping the oscillation wavelength of the semiconductor laser to measure the optical absorption spectrum of the gas to be measured is described with reference to FIG. 8A to FIG. 8C.

Figure 8A:
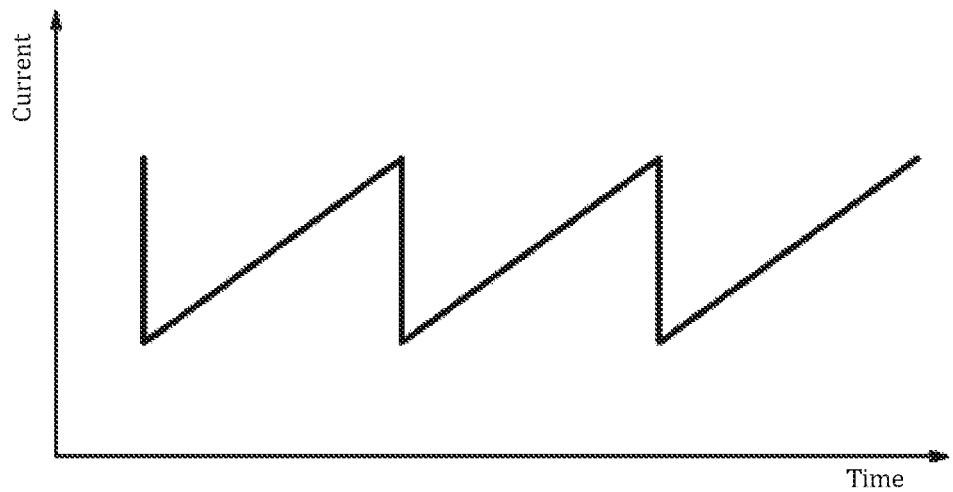
FIG. 8A is a schematic view illustrating an injection current of a semiconductor laser that is repeatedly swept.

FIG. 8A is a schematic view illustrating the injection current of the semiconductor laser that is repeatedly swept. The oscillation wavelength of the semiconductor laser matches the wavelength band of the optical absorption spectrum to be measured and is repeatedly swept in this wavelength band. At this time, the injection current of the semiconductor laser is repeatedly swept. For example, the injection current of the semiconductor laser exhibits a sawtooth wave.

Figure 8B:
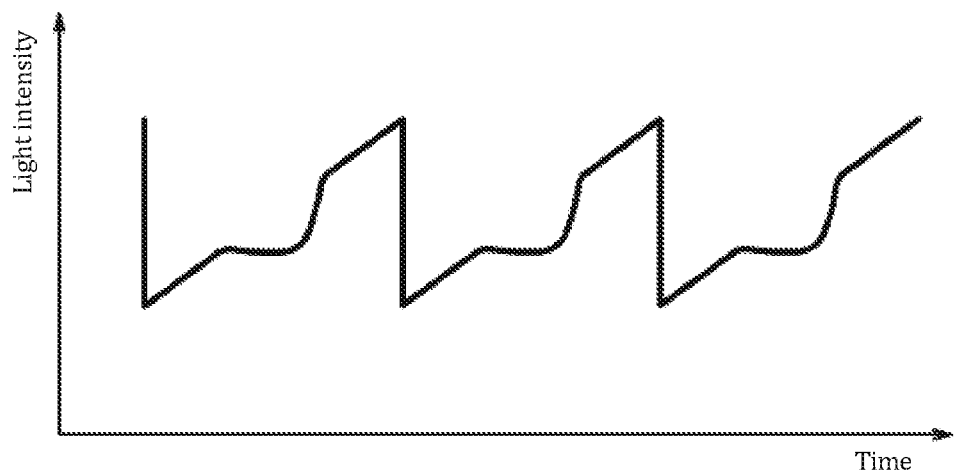
FIG. 8B is a schematic view illustrating changes in light intensity of a semiconductor-laser light permeating a gas to be measured.
Figure 8C:
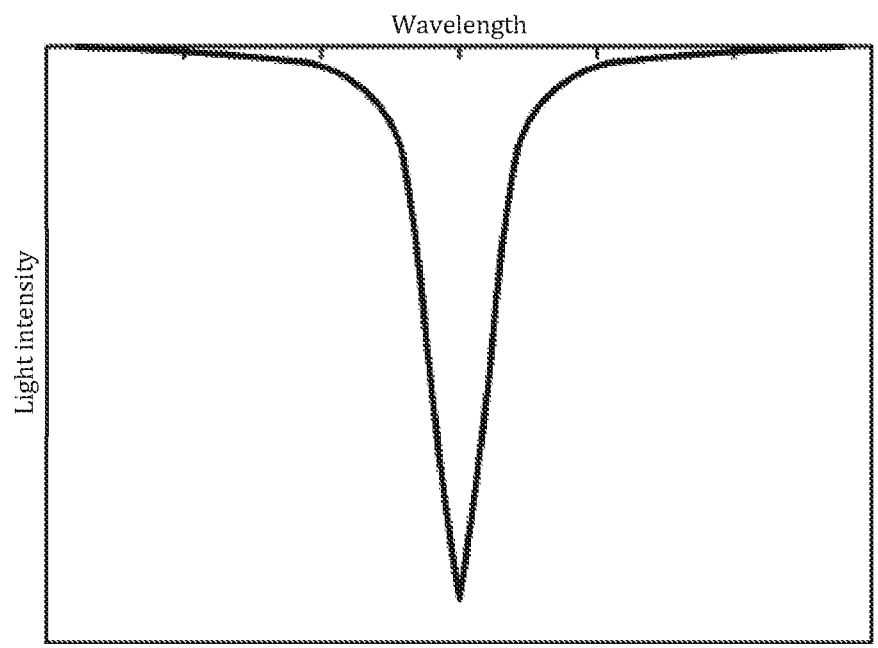
FIG. 8C is a schematic view illustrating a calculated optical absorption spectrum of the gas to be measured.

FIG. 8B is a schematic view illustrating changes in the light intensity of the semiconductor-laser light permeating the gas to be measured. The semiconductor-laser light whose oscillation wavelength is repeatedly swept permeates the gas to be measured and is condensed to a light-receiving unit. The light-receiving unit outputs a reception signal such as that illustrated in FIG. 8B reflecting an optical absorption amount for each wavelength of the semiconductor-laser light by the gas to be measured. At this time, an irradiation intensity of the semiconductor-laser light also changes in conjunction with the sweeping of the injection current of the semiconductor laser. For example, the irradiation intensity increases as the injection current increases. Therefore, based on the changes in the irradiation intensity accompanying the sweeping of the injection current and changes in the optical absorption amount for each wavelength by the gas to be measured, the reception signal output from the light-receiving unit exhibits a waveform resembling dips superimposed on a sawtooth wave.

Based on a reception signal such as that illustrated in FIG. 8B, the optical absorption spectrum of the gas to be measured is calculated. FIG. 8C is a schematic view illustrating the calculated optical absorption spectrum of the gas to be measured. The optical absorption spectrum is calculated by, for example, subtracting a reception signal of when the semiconductor-laser light does not permeate the gas to be measured from the reception signal of when the semiconductor-laser light permeates the gas to be measured and making a vertical axis a logarithm. The absorbance exhibited by such an optical absorption spectrum is proportional to the component concentrations of the gas to be measured. For example, an area of the optical absorption spectrum is proportional to the component concentrations of the gas to be measured. Therefore, the component concentrations of the gas to be measured can be calculated based on the absorbance.

Figure 9:
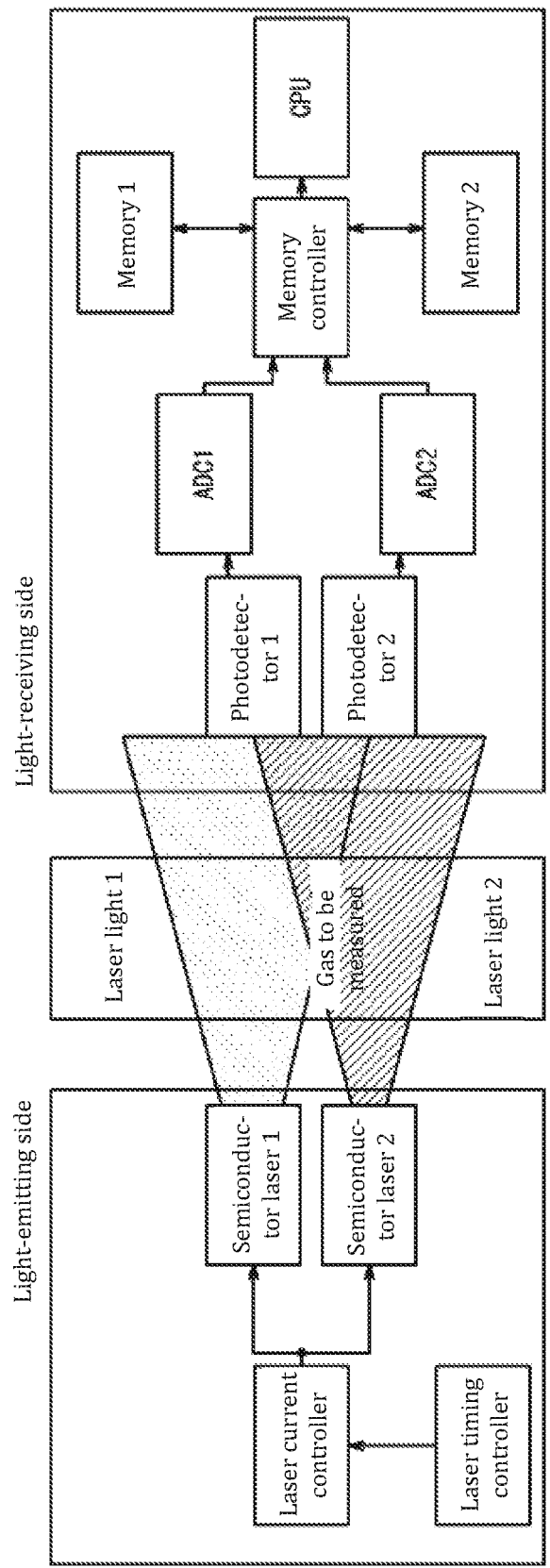
FIG. 9 is a block diagram illustrating a conventional spectrometry device used in spectrometry of two types of analysis-subject components of different analysis wavelengths.

FIG. 9 is a block diagram illustrating a conventional spectrometry device used in spectrometry of two types of analysis-subject components of different analysis wavelengths.

Conventionally, to perform spectrometry of two types of analysis-subject components of different analysis wavelengths, two semiconductor lasers of different wavelength bands are used. The two analysis-subject components can be analyzed by detecting, by light-receiving units, light to be measured based on laser light irradiated from each semiconductor laser and obtaining reception signals.

A laser current controller generates a wavelength sweeping signal based on a timing controlled by a laser timing controller. The wavelength sweeping signal generated in the laser current controller is output to a semiconductor laser 1 and a semiconductor laser 2. The semiconductor laser 1 and the semiconductor laser 2 respectively repeatedly irradiate a laser light 1 and a laser light 2 at the same timing.

A photodetector 1 and a photodetector 2 respectively receive the laser light 1 and the laser light 2, which permeate a gas to be measured, and convert these into electrical signals. An analog-digital converter (ADC) 1 and an ADC 2 respectively convert analog signals output from the photodetector 1 and the photodetector 2 into digital signals. A memory controller aggregates each converted digital signal and stores corresponding measurement data in a memory 1 and a memory 2. A CPU (central processing unit) executes an averaging process for a prescribed sweeping count based on the measurement data stored in the memory 1 and the memory 2 and calculates each optical absorption spectrum to execute spectrometry of the two types of analysis-subject components. Here, the term "prescribed sweeping count" signifies a sweeping count necessary in spectrometric computation.

The laser current controller sweeps oscillation wavelengths of the semiconductor lasers by sweeping injection currents of the semiconductor lasers in an order of mA. In TDLAS, for example, the CPU needs to acquire dark-current values from the photodetectors output when the semiconductor lasers are turned off in a process of calculating component concentrations. In TDLAS, the injection currents change rapidly between a state where the semiconductor lasers are turned off when acquiring the dark-current values and a state where, to obtain desired oscillation wavelengths, the semiconductor lasers are turned on according to corresponding current values. Therefore, cross talk and noises are generated on circuits.

For example, when noises generated based on one injection current interferes with the other injection current, the oscillation wavelengths drift. Additionally, the outputs from the photodetectors are currents in an order of μA. When there is interference based on the injection currents on such outputs from the photodetectors, there is a risk of waveforms of the acquired reception signals becoming distorted and correct optical absorption spectra not being obtained. Therefore, to ignore an influence of a transient response of the injection currents changing greatly between the state where the semiconductor lasers are turned off when acquiring the dark-current values and the state where, to obtain the desired oscillation wavelengths, the semiconductor lasers are turned on according to the corresponding current values, a dead time of not measuring the optical absorption spectra is provided. To make this dead time the same between the semiconductor laser 1 and the semiconductor laser 2, the semiconductor laser 1 and the semiconductor laser 2 are completely synchronized with each other to perform emission at the same timing.

In TDLAS, when optical-path lengths from the semiconductor lasers to the photodetectors are large, as illustrated in FIG. 9 for example, the laser light may be intentionally diffused by a lens or the like. At this time, the two beams of light to be measured based on the two beams of laser light respectively irradiated at mutually identical timings from the two semiconductor lasers are simultaneously received by each photodetector. When wavelength bands having reception sensitivity mutually overlap between the photodetector 1 and the photodetector 2, the reception signals output from each photodetector come to include information relating to the optical absorption spectrum based on the other laser light that differs from the one corresponding laser light. This reduces analysis precision.

Additionally, when performing mutually simultaneous emission, wavelength sweeping times of the semiconductor laser 1 and the semiconductor laser 2 need to be matched with each other to perform emission in a completely synchronized manner. Normally, it is often the case that wavelength sweeping times that are minimally necessary for spectrometry for each wavelength sweeping are not matched with each other, and the timing needs to be matched to the longer minimally necessary wavelength sweeping time. This makes the measurement data based on the semiconductor laser whose minimally necessary wavelength sweeping time may be shorter redundant, creating disadvantages such as waste of a memory.

One or more embodiments provide a spectrometry device and a spectrometry method that improve analysis precision of spectrometry performed based on two beams of irradiated light even when wavelength bands having reception sensitivity mutually overlap between two photodetectors. One or more embodiments will be described below with reference to the attached drawings.

First Embodiment

FIG. 1 is a block diagram illustrating one example of a configuration of a spectrometry device 1 of a first embodiment. The spectrometry device 1 irradiates, for example, two types of irradiated light of different wavelength bands to gas G to be measured and can also analyze different analysis-subject components in the gas G to be measured based on reception signals processed by different light-receiving units. The spectrometry device 1 includes, for example, a TDLAS laser gas analyzer.

The gas G to be measured includes gas molecules of, for example, CO, $CO_2$, $H_2O$, $C_nH_m$, $NH_3$, and $O_2$. The gas G to be measured includes a first analysis-subject component C1 and a second analysis-subject component C2 to be subjects of the analysis by the spectrometry device 1. The first analysis-subject component C1 and the second analysis-subject component C2 include mutually different gas components. Not being limited thereto, the first analysis-subject component C1 and the second analysis-subject component C2 may include mutually identical gas components.

As illustrated in FIG. 1, the spectrometry device 1 has two constituent portions: a light-emitting side and a light-receiving side. For example, the spectrometry device 1 has a timing controller 10, a current controller 20, a first switching unit 31 and a second switching unit 32, and a first light-emitting unit 41 and a second light-emitting unit 42, these constituting the light-emitting side. The spectrometry device 1 has a first light-receiving unit 51 and a second light-receiving unit 52, a first conversion unit 61 and a second conversion unit 62, a memory controller 70, a first storage unit 81 and a second storage unit 82, and a CPU 90, these constituting the light-receiving side. The timing controller 10, the current controller 20, the memory controller 70, and the CPU 90 constitute a control unit 100. The first storage unit 81 and the second storage unit 82 constitute a storage unit 80. For example, in the spectrometry device 1 according to one or more embodiments, the first light-emitting unit 41 and the second light-emitting unit 42 are disposed respectively opposite to the first light-receiving unit 51 and the second light-receiving unit 52 with the gas G to be measured—for example, with a measurement region where the gas G to be measured can be present—interposed therebetween.

The timing controller 10 is connected to the current controller 20, the first switching unit 31 and the second switching unit 32, and the memory controller 70. For example, the timing controller 10 controls the current controller 20 to repeatedly output at mutually identical timings wavelength sweeping signals for causing the first light-emitting unit 41 and the second light-emitting unit 42 to operate. For example, the timing controller 10 switches on/off of the first switching unit 31 and the second switching unit 32. In this way, among the wavelength sweeping signals for the first light-emitting unit 41 and the second light-emitting unit 42 repeatedly output at the mutually identical timings from the current controller 20, either the wavelength sweeping signal for the first light-emitting unit 41 or the wavelength sweeping signal for the second light-emitting unit 42 is output at mutually different timings. For example, the timing controller 10 outputs a control signal for controlling the first switching unit 31 and the second switching unit 32 to the memory controller 70 as well.

The current controller 20 is connected to the first light-emitting unit 41 and the second light-emitting unit 42 via the first switching unit 31 and the second switching unit 32, respectively, and controls the operations of the first light-emitting unit 41 and the second light-emitting unit 42. For example, based on the timings controlled by the timing controller 10, the current controller 20 repeatedly outputs at mutually identical timings the wavelength sweeping signals for causing the first light-emitting unit 41 and the second light-emitting unit 42 to operate.

The first switching unit 31 includes any signal switching circuits—for example, a field-programmable gate array (FPGA). Based on the control signal acquired from the timing controller 10, the first switching unit 31 switches on/off of the wavelength sweeping signal for the first light-emitting unit 41 being repeatedly output from the current controller 20. The first switching unit 31 outputs the wavelength sweeping signal for the first light-emitting unit 41 at a timing different from the output timing of the wavelength sweeping signal for the second light-emitting unit 42 from the second switching unit 32. For example, the first switching unit 31 outputs to the first light-emitting unit 41 a wavelength sweeping signal converted from a digital signal into an analog signal by a digital—analog converter (DAC) included in the first switching unit 31.

The second switching unit 32 includes any signal switching circuit—for example, a field-programmable gate array (FPGA). Based on the control signal acquired from the timing controller 10, the second switching unit 32 switches on/off of the wavelength sweeping signal for the second light-emitting unit 42 being repeatedly output from the current controller 20. The second switching unit 32 outputs the wavelength sweeping signal for the second light-emitting unit 42 at a timing different from the output timing of the wavelength sweeping signal for the first light-emitting unit 41 from the first switching unit 31. For example, the second switching unit 32 outputs to the second light-emitting unit 42 a wavelength sweeping signal converted from a digital signal into an analog signal by a DAC included in the second switching unit 32.

The first light-emitting unit 41 includes, for example, any light source that enables TDLAS measurement of the gas G to be measured. The first light-emitting unit 41 includes, for example, a semiconductor laser. Based on an injection current as the wavelength sweeping signal output from the first switching unit 31, the first light-emitting unit 41 irradiates first irradiated light L1 whose oscillation wavelength is swept to the gas G to be measured. The first light-emitting unit 41 irradiates the first irradiated light L1 to the gas G to be measured at a timing of acquiring the wavelength sweeping signal upon the first switching unit 31 being turned on.

The second light-emitting unit 42 includes, for example, any light source that enables TDLAS measurement of the gas G to be measured. The second light-emitting unit 42 includes, for example, a semiconductor laser. Based on an injection current as the wavelength sweeping signal output from the second switching unit 32, the second light-emitting unit 42 irradiates second irradiated light L2 whose oscillation wavelength is swept to the gas G to be measured. The second light-emitting unit 42 irradiates the second irradiated light L2 to the gas G to be measured at a timing of acquiring the wavelength sweeping signal upon the second switching unit 32 being turned on.

Each light-emitting unit may irradiate an irradiated light whose oscillation wavelength is swept in the same wavelength range over a plurality of periods. Here, one period is a time during which the wavelength sweeping is performed for one run and a plurality of periods is a time during which the wavelength sweeping is performed for a plurality of runs, including gap times when repeatedly performing the wavelength sweeping. When the first analysis-subject component C1 and the second analysis-subject component C2 include mutually different gas components, the oscillation wavelength of the first light-emitting unit 41 and the oscillation wavelength of the second light-emitting unit 42 respectively correspond to analysis wavelengths of the first analysis-subject component C1 and the second analysis-subject component C2 and are mutually different. Not being limited thereto, when the first analysis-subject component C1 and the second analysis-subject component C2 include mutually identical gas components, the oscillation wavelength of the first light-emitting unit 41 and the oscillation wavelength of the second light-emitting unit 42 may respectively correspond to the analysis wavelengths of the first analysis-subject component C1 and the second analysis-subject component C2 and be mutually identical.

The first light-receiving unit 51 includes, for example, any photodetector that enables TDLAS measurement of the gas G to be measured. The first light-receiving unit 51 includes, for example, a photodiode. The first light-receiving unit 51 outputs a first reception signal S1, which includes information relating to a first optical spectrum O1 of the first analysis-subject component C1 in the gas G to be measured and is obtained based on the first irradiated light L1. The first optical spectrum O1 includes, for example, a first optical absorption spectrum. At this time, the first reception signal S1 includes information relating to the first optical absorption spectrum of the first analysis-subject component C1.

The second light-receiving unit 52 includes, for example, any photodetector that enables TDLAS measurement of the gas G to be measured. The second light-receiving unit 52 includes, for example, a photodiode. The second light-receiving unit 52 outputs a second reception signal S2, which includes information relating to a second optical spectrum O2 of the second analysis-subject component C2 in the gas G to be measured and is obtained based on the second irradiated light L2. The second optical spectrum O2 includes, for example, a second optical absorption spectrum. At this time, the second reception signal S2 includes information relating to the second optical absorption spectrum of the second analysis-subject component C2.

The first conversion unit 61 includes, for example, an ADC. The first conversion unit 61 is connected to the first light-receiving unit 51. The first conversion unit 61 converts the first reception signal S1 output from the first light-receiving unit 51 from an analog signal into a digital signal.

The second conversion unit 62 includes, for example, an ADC. The second conversion unit 62 is connected to the second light-receiving unit 52. The second conversion unit 62 converts the second reception signal S2 output from the second light-receiving unit 52 from an analog signal into a digital signal.

The memory controller 70 is connected to the first conversion unit 61, the second conversion unit 62, and the timing controller 10. The memory controller 70 respectively stores information relating to the first reception signal S1 output from the first conversion unit 61 and information relating to the second reception signal S2 output from the second conversion unit 62 in the first storage unit 81 and the second storage unit 82 at predetermined timings based on the control signal acquired from the timing controller 10.

The first storage unit 81 and the second storage unit 82 are each connected to the memory controller 70. Each storage unit includes any storage device—for example, a hard disk drive (HDD), a solid-state drive (SSD), an electrically erasable programmable read-only memory (EEPROM), a read-only memory (ROM), or a random-access memory (RAM). Each storage unit may function as, for example, a main storage device, an auxiliary storage device, or a cache memory. Each storage unit is not limited to being built into the spectrometry device 1 and may be an external storage device connected by a digital input/output port or the like such as a USB.

The first storage unit 81 stores the information relating to the first reception signal S1 digitalized by the first conversion unit 61. The second storage unit 82 stores the information relating to the second reception signal S2 digitalized by the second conversion unit 62.

The CPU 90 is connected to the first storage unit 81 and the second storage unit 82 via the memory controller 70. The CPU 90 determines, for example, whether an acquisition time of the first reception signal S1 in the memory controller 70 reaches a first time period, which includes a prescribed sweeping count. When it is determined that the acquisition time reaches the first time period, the CPU 90 acquires the information relating to the first reception signal S1 from the first storage unit 81 and calculates the first optical spectrum O1. Likewise, the CPU 90 determines, for example, whether an acquisition time of the second reception signal S2 in the memory controller 70 reaches a second time period, which includes a prescribed sweeping count. When it determines that the acquisition time reaches the second time period, the CPU 90 acquires the information relating to the second reception signal S2 from the second storage unit 82 and calculates the second optical spectrum O2.

The CPU 90 performs any signal processing on the acquired first reception signal S1 and second reception signal S2. For example, the CPU 90 may average the acquired first reception signal S1 over a plurality of periods. For example, the CPU 90 may average the acquired second reception signal S2 over a plurality of periods. The term "average" signifies, for example, to add signal intensities of the same wavelength portions of a sweeping waveform for each period and to divide by the total number of sweeping. The CPU 90 may respectively calculate the first optical spectrum O1 and the second optical spectrum O2 from the acquired first reception signal S1 and second reception signal S2 by such an averaging process.

The control unit 100 includes one or more processors. For example, the control unit 100 includes any processor, such as a dedicated processor that can realize the various controls, processes, and the like by the timing controller 10, the current controller 20, the memory controller 70, and the CPU 90 described above. The control unit 100 is connected to each constituent part that is a control subject of the spectrometry device 1 and controls and manages each constituent part.

Figure 2:
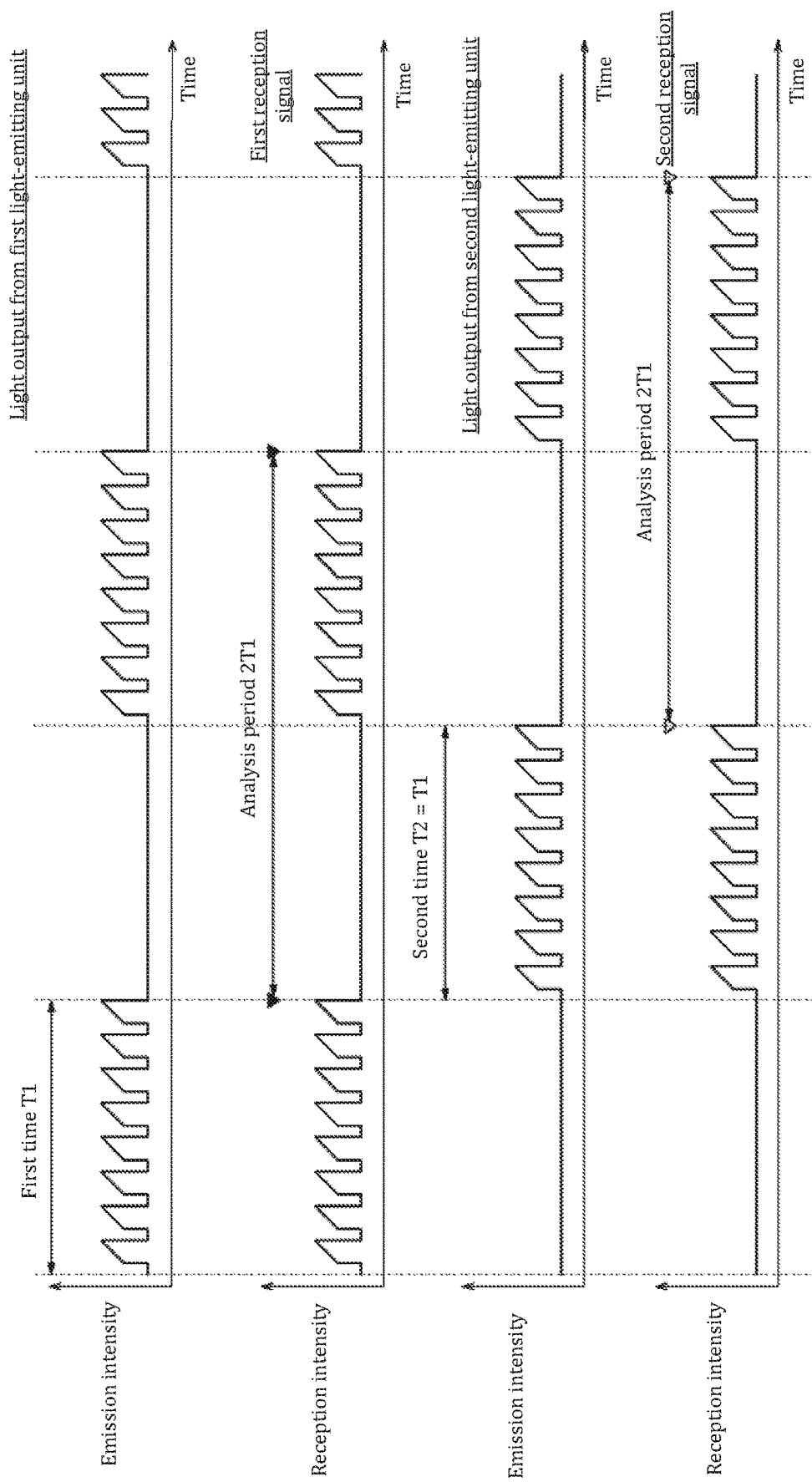
FIG. 2 is a schematic view illustrating a first example of controls and processes executed by a control unit of the first embodiment.

FIG. 2 is a schematic view illustrating a first example of the controls and processes executed by the control unit 100 of the first embodiment. A content of the controls and processes executed by the control unit 100 is mainly described with reference to FIG. 2.

In FIG. 2, the horizontal axis indicates time. The top graph in FIG. 2 illustrates change over time in light output from the first light-emitting unit 41. This graph illustrates the oscillation wavelength of the first irradiated light L1 from the first light-emitting unit 41 being repeatedly swept in a certain wavelength range over a plurality of periods and an emission intensity changing monotonically each period due to such wavelength sweeping. The graph that is second from the top in FIG. 2 illustrates change over time in the first reception signal S1 acquired by the memory controller 70. The graph that is third from the top in FIG. 2 illustrates change over time in light output from the second light-emitting unit 42. This graph illustrates the oscillation wavelength of the second irradiated light L2 from the second light-emitting unit 42 being repeatedly swept in a certain wavelength range over a plurality of periods and an emission intensity changing monotonically each period due to such wavelength sweeping. The bottom graph in FIG. 2 illustrates change over time in the second reception signal S2 acquired by the memory controller 70.

In the graph that is second from the top and the bottom graph in FIG. 2, for convenience in illustration, change in reception intensity based on optical absorption spectrum is omitted, and the reception intensity is illustrated as increasing linearly each period. However, an actual graph shows a waveform superimposed with a dip based on an optical absorption spectrum such as that illustrated in FIG. 8B.

Here, as above, the emission intensities change in conjunction with, for example, sweeping of the injection currents of the semiconductor lasers. That is, change in emission intensity in FIG. 2 may correspond to change in injection current. Not being limited thereto, change in emission intensity may correspond to change in sweeping voltage input to any wavelength sweeping mechanism controlled by voltage. Likewise, change in reception intensity may correspond to change in current or correspond to change in voltage to match an output form of the signal in each light-receiving unit.

As illustrated in the top graph and the graph that is third from the top in FIG. 2, the control unit 100—for example, the timing controller 10—controls the first switching unit 31 and the second switching unit 32, and the first irradiated light L1 and the second irradiated light L2 are irradiated at mutually different timings from the first light-emitting unit 41 and the second light-emitting unit 42. For example, the timing controller 10 turns on the switching unit 31 and turns off the second switching unit 32, and a plurality of light pulses of the first irradiated light L1 is irradiated consecutively from the first light-emitting unit 41 during a first time period T1. The timing controller 10 turns on the second switching unit 32 and turns off the first switching unit 31, and a plurality of light pulses of the second irradiated light L2 are irradiated consecutively from the second light-emitting unit 42 during a second time period T2 following the first time period T1. As illustrated in FIG. 2, for example, the first time period T1 and the second time period T2 may be mutually identical. Additionally, a wavelength sweeping time of the first irradiated light L1 and a wavelength sweeping time of the second irradiated light L2 may be mutually identical.

As illustrated in the graph that is second from the top and the bottom graph in FIG. 2, the control unit 100—for example, the memory controller 70—respectively stores the information relating to the first reception signal S1 and the information relating to the second reception signal S2 in the first storage unit 81 and the second storage unit 82 at mutually different timings, in synchronization with the irradiation timings of the first irradiated light L1 and the second irradiated light L2. For example, the memory controller 70 consecutively stores a plurality of pieces of information relating to the first reception signal S1 in the first storage unit 81 during the first time period T1. At this time, the memory controller 70 does not store measurement data of the second light-emitting unit 42, which is not emitting light, in the second storage unit 82. The memory controller 70 consecutively stores a plurality of pieces of information relating to the second reception signal S2 in the second storage unit 82 during the second time period T2 following the first time period T1. At this time, the memory controller 70 does not store measurement data of the first light-emitting unit 41, which is not emitting light, in the first storage unit 81.

When, for example, a time elapsed from switching to the control of light emission by the first light-emitting unit 41 reaches the first time period T1, the CPU 90 acquires the information relating to the first optical spectrum O1 based on the information relating to the first reception signal S1 stored in the first storage unit 81 during the first time period T1 Likewise, when, for example, a time elapsed from switching to the control of light emission by the second light-emitting unit 42 reaches the second time period T2, the CPU 90 acquires the information relating to the second optical spectrum O2 based on the information relating to the second reception signal S2 stored in the second storage unit 82 during the second time period T2.

For example, the CPU 90 analyzes the first optical absorption spectrum of the first analysis-subject component C1 based on the acquired first reception signal S1 at timings indicated by the black upside-down triangles in FIG. 2. For example, the CPU 90 analyzes the second optical absorption spectrum of the second analysis-subject component C2 based on the acquired second reception signal S2 at timings indicated by the white upside-down triangles in FIG. 2.

After the second time period T2 is elapsed, the timing controller 10 again controls the first switching unit 31 and the second switching unit 32 so only the first irradiated light L1 is irradiated from the first light-emitting unit 41. Afterward, the timing controller 10, the memory controller 70, and the CPU 90 repeat the controls and the processes described above. In the first example illustrated in FIG. 2, because the first time period T1 and the second time period T2 are identical, an analysis period of analyzing the first optical absorption spectrum of the first analysis-subject component C1 and an analysis period of analyzing the second optical absorption spectrum of the second analysis-subject component C2 are each 2T1 and mutually identical.

Figure 3:
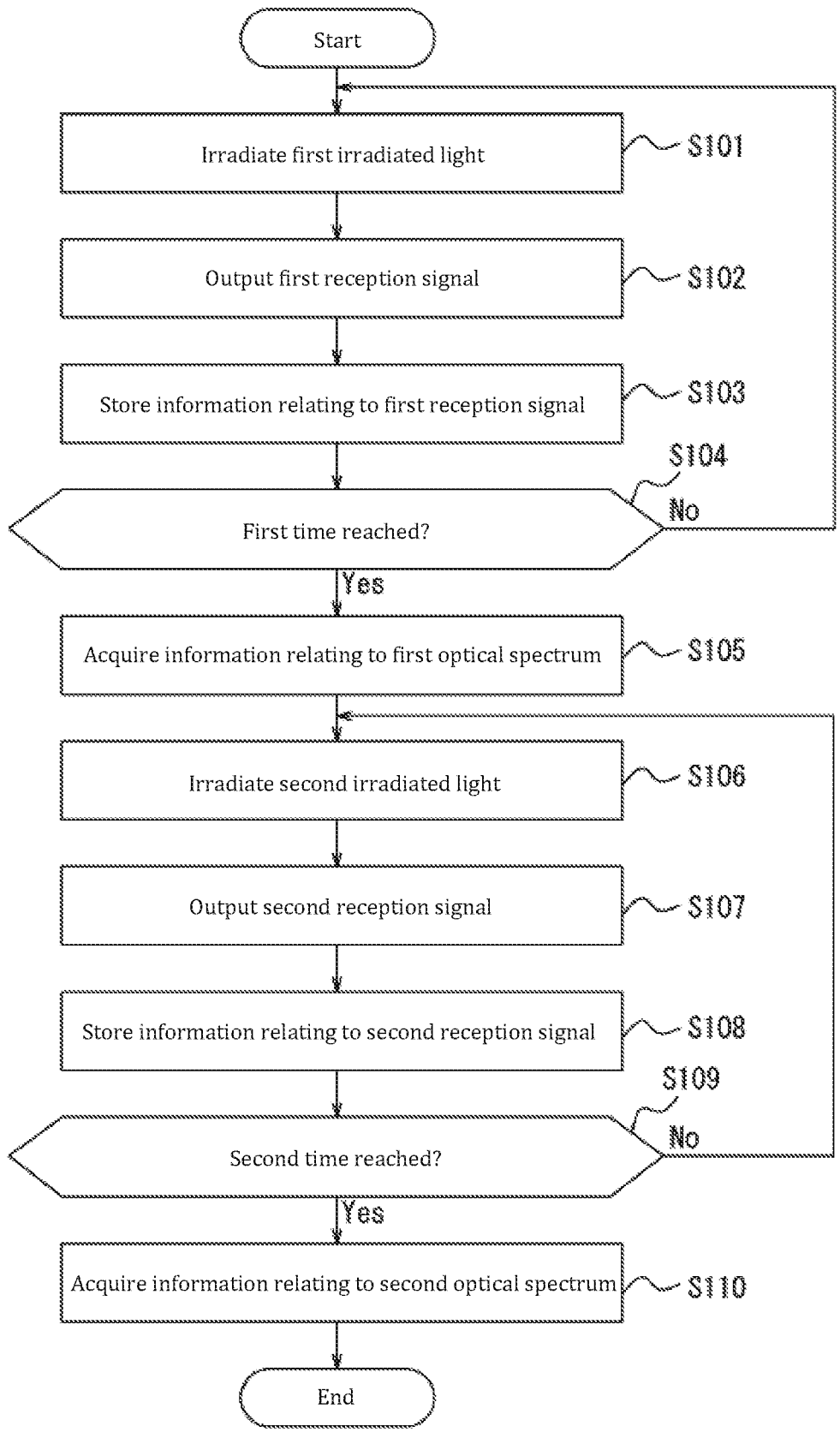
FIG. 3 is a flowchart illustrating one example of a spectrometry method using the spectrometry device of the first embodiment.

FIG. 3 is a flowchart illustrating one example of a spectrometry method using the spectrometry device 1 of the first embodiment. One example of a flow of spectrometry of the gas G to be measured executed by the spectrometry device 1 of the first embodiment is mainly described with reference to FIG. 3.

At step S101, the control unit 100—for example, the timing controller 10—causes the first irradiated light L1 to be irradiated from the first light-emitting unit 41 to the gas G to be measured.

At step S102, the first light-receiving unit 51 receives the first irradiated light L1 as light to be measured permeating the gas G to be measured. The first light-receiving unit 51 outputs the first reception signal S1 that includes the information relating to the first optical spectrum O1 of the first analysis-subject component C1 in the gas G to be measured and is obtained based on the first irradiated light L1 irradiated at step S101.

At step S103, based on the control by the control unit 100—for example, the memory controller 70—the first storage unit 81 stores the information relating to the first reception signal S1 in synchronization with the irradiation timing of the first irradiated light L1.

At step S104, the control unit 100 determines whether the time elapsed from the control of switching on the first switching unit 31 and switching off the second switching unit 32 to cause only the first light-emitting unit 41 to emit light reaches the first time period T1. When it is determined that the first time period T1 is reached, the control unit 100 executes a process of step S105. When it is determined that the first time period T1 is not reached, the control unit 100 executes the process of step S101.

At step S105, when it is determined at step S104 that the first time period T1 is reached, the control unit 100—for example, the CPU 90—acquires the information relating to the first optical spectrum O1 based on the information relating to the first reception signal S1 stored in the first storage unit 81 during the first time period T1.

At step S106, the control unit 100—for example, the timing controller 10—switches on the first switching unit 31, switches off the second switching unit 32, and causes the second irradiated light L2 to be irradiated from the second light-emitting unit 42 to the gas G to be measured at a different timing from that of the first irradiated light L1.

At step S107, the second light-receiving unit 52 receives the second irradiated light L2 as light to be measured permeating the gas G to be measured. The second light-receiving unit 52 outputs the second reception signal S2 that includes the information relating to the second optical spectrum O2 of the second analysis-subject component C2 in the gas G to be measured and is obtained based on the second irradiated light L2 irradiated at step S106.

At step S108, based on the control by the control unit 100—for example, the memory controller 70—the second storage unit 82 stores the information relating to the second reception signal S2 in synchronization with the irradiation timing of the second irradiated light L2, at a timing that differs from the storage timing of the information relating to the first reception signal S1.

At step S109, the control unit 100 determines whether the time elapsed from the control of switching on the second switching unit 32 and switching off the first switching unit 31 to cause only the second light-emitting unit 42 to emit light reaches the second time period T2. When it is determined that the second time period T2 is reached, the control unit 100 executes a process of step S110. When it is determined that the second time period T2 is not reached, the control unit 100 executes the process of step S106.

At step S110, when it is determined at step S109 that the second time period T2 is reached, the control unit 100—for example, the CPU 90—acquires the information relating to the second optical spectrum O2 based on the information relating to the second reception signal S2 stored in the second storage unit 82 during the second time period T2.

In the spectrometry device 1 according to the first embodiment as described above, analysis precision is improved even when spectrometry is performed based on two beams of irradiated light, i. e. the first irradiated light L1 and the second irradiated light L2. For example, by irradiating the first irradiated light L1 and the second irradiated light L2 from the first light-emitting unit 41 and the second light-emitting unit 42 at mutually different timings, the spectrometry device 1 can, while executing measurement by a combination of the first light-emitting unit 41 and the first light-receiving unit 51, perform spectrometry based on measurement data for which interference is suppressed by not making the light to be measured based on the second irradiated light L2 that does not correspond to the measurement incident to the first light-receiving unit 51. Likewise, the spectrometry device 1 can, while executing measurement by a combination of the second light-emitting unit 42 and the second light-receiving unit 52, perform spectrometry based on measurement data for which interference is suppressed by not making the light to be measured based on the first incident light L1 that does not correspond to the measurement incident to the second light-receiving unit 52.

For example, even when, in TDLAS, the irradiated light is emitted while being intentionally diffused when optical-path lengths from each light-emitting unit to the corresponding light-receiving units are long, the first irradiated light L1 and the second irradiated light L2 are respectively irradiated from the first light-emitting unit 41 and the second light-emitting unit 42 at mutually different timings. Therefore, the two beams of light to be measured based on the first irradiated light L1 and the second irradiated light L2 are not received simultaneously by the first light-receiving unit 51 and the second light-receiving unit 52. By this, for example, the light to be measured received by the first light-receiving unit 51 does not simultaneously include the first irradiated light L1 and the second irradiated light L2. Likewise, the light to be measured received by the second light-receiving unit 52 does not simultaneously include the first irradiated light L1 and the second irradiated light L2. Therefore, the reception signals output from each light-receiving unit do not include information relating to the optical absorption spectrum based on the other irradiated light that differs from the one corresponding irradiated light. This results in improved analysis precision.

By the memory controller 70 storing the information relating to the first reception signal S1 and the information relating to the second reception signal S2 in the storage unit 80 at mutually different timings in synchronization with the irradiation timings of the first irradiated light L1 and the second irradiated light L2 based on the control signal output from the timing controller 10, the CPU 90 can accurately execute the averaging process. For example, by a control signal such as above, the memory controller 70 can identify which light-emitting unit is emitting light at each point, and only the information relating to the reception signal based on the irradiated light from the light-emitting unit performing the emission operation can be accurately stored in the corresponding storage unit 80. By this, in the averaging process, the CPU 90 can calculate an accurate absolute value of an average waveform without adding measurement data from the light-receiving unit corresponding to the light-emitting unit that is not emitting light.

The memory controller 70 does not unnecessarily store the measurement data from the light-receiving unit corresponding to the light-emitting unit that is not emitting light in the storage unit 80. Therefore, a storage capacity of the storage unit 80 is used efficiently, and the storage capacity is suppressed from being wasted.

By the first time period T1 and the second time period T2 being mutually identical, the spectrometry device 1 can simplify the timings of respectively analyzing the first analysis-subject component C1 and the second analysis-subject component C2. Therefore, the analysis processes executed by the spectrometry device 1 are simplified.

By the first analysis-subject component C1 and the second analysis-subject component C2 including mutually different gas components, spectrometry of the different gas components included in the gas G to be measured can be performed by one device.

By the first reception signal S1 including the information relating to the first optical absorption spectrum of the first analysis-subject component C1 and the second reception signal S2 including the information relating to the second optical absorption spectrum of the second analysis-subject component C2, the spectrometry device 1 can easily calculate the optical spectra. For example, in other spectroscopic methods such as fluorescence spectroscopy and Raman spectroscopy, an intensity of a light to be measured, such as a fluorescent light or a Raman light, is weak, and detecting the light to be measured is not easy. In contrast, using absorption spectroscopy increases an intensity of the light to be measured and facilitates detection of the light to be measured.

Figure 4:
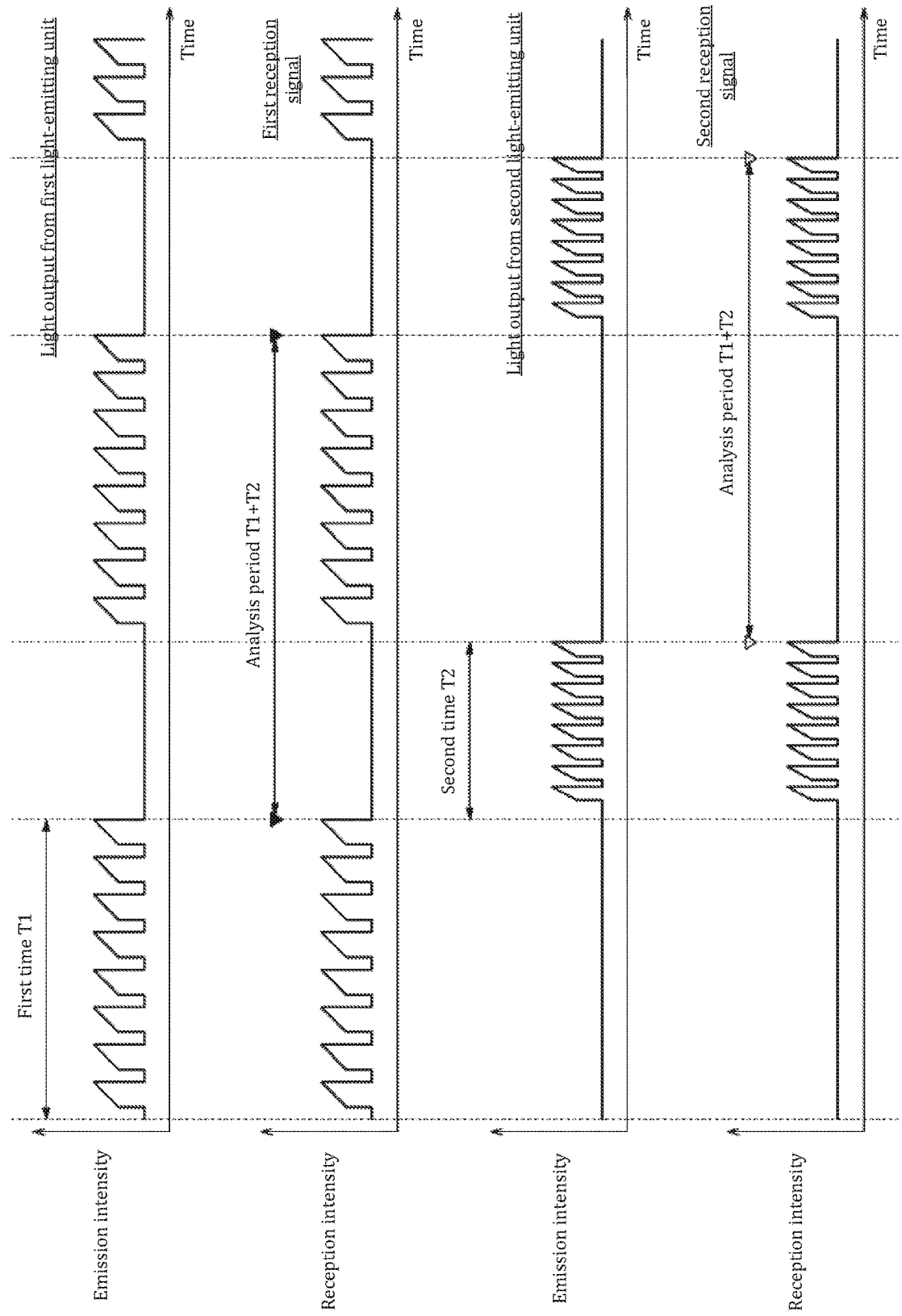
FIG. 4 is a schematic view illustrating a second example of controls and processes executed by the control unit of the first embodiment.

FIG. 4 is a schematic view illustrating a second example of controls and processes executed by the control unit 100 according to the first embodiment. FIG. 4 corresponds to FIG. 2. In the spectrometry device 1 according to the first embodiment described above, the first time period T1 and the second time period T2 are described as being mutually identical, but these are not limited thereto. The first time period T1 and the second time period T2 may be mutually different. Likewise, the wavelength sweeping time of the first irradiated light L1 and the wavelength sweeping time of the second irradiated light L2 may be mutually different. The number of wavelength sweeping of the first irradiated light L1 and the number of wavelength sweeping of the second irradiated light L2 may be mutually identical or mutually different.

For example, as illustrated in FIG. 4, the second time period T2 may be shorter than the first time period T1. At this time, for example, the wavelength sweeping time of the second irradiated light L2 included in the second time period T2 may be shortened, and a light-pulse width of the second irradiated light L2 may be shortened. Not being limited thereto, instead of or in addition to the wavelength sweeping time, the number of wavelength sweeping of the second irradiated light L2 included in the second time period T2—that is, a number of light pulses of the second irradiated light L2—may be reduced. At this time, the analysis period of analyzing the first optical absorption spectrum of the first analysis-subject component C1 and the analysis period of analyzing the second optical absorption spectrum of the second analysis-subject component C2 each become T1+T2 and are mutually identical.

As above, because the spectrometry device 1 according to the first embodiment does not need to take into consideration crosstalk and noise on circuits as in the conventional art, it can also control each constituent part at wavelength sweeping times and the number of wavelength sweeping that are optimal for respective analyses of the first analysis-subject component C1 and the second analysis-subject component C2. By this, the storage capacity of the storage unit 80 is used more efficiently, and the storage capacity is further suppressed from being wasted.

Second Embodiment

Figure 5:
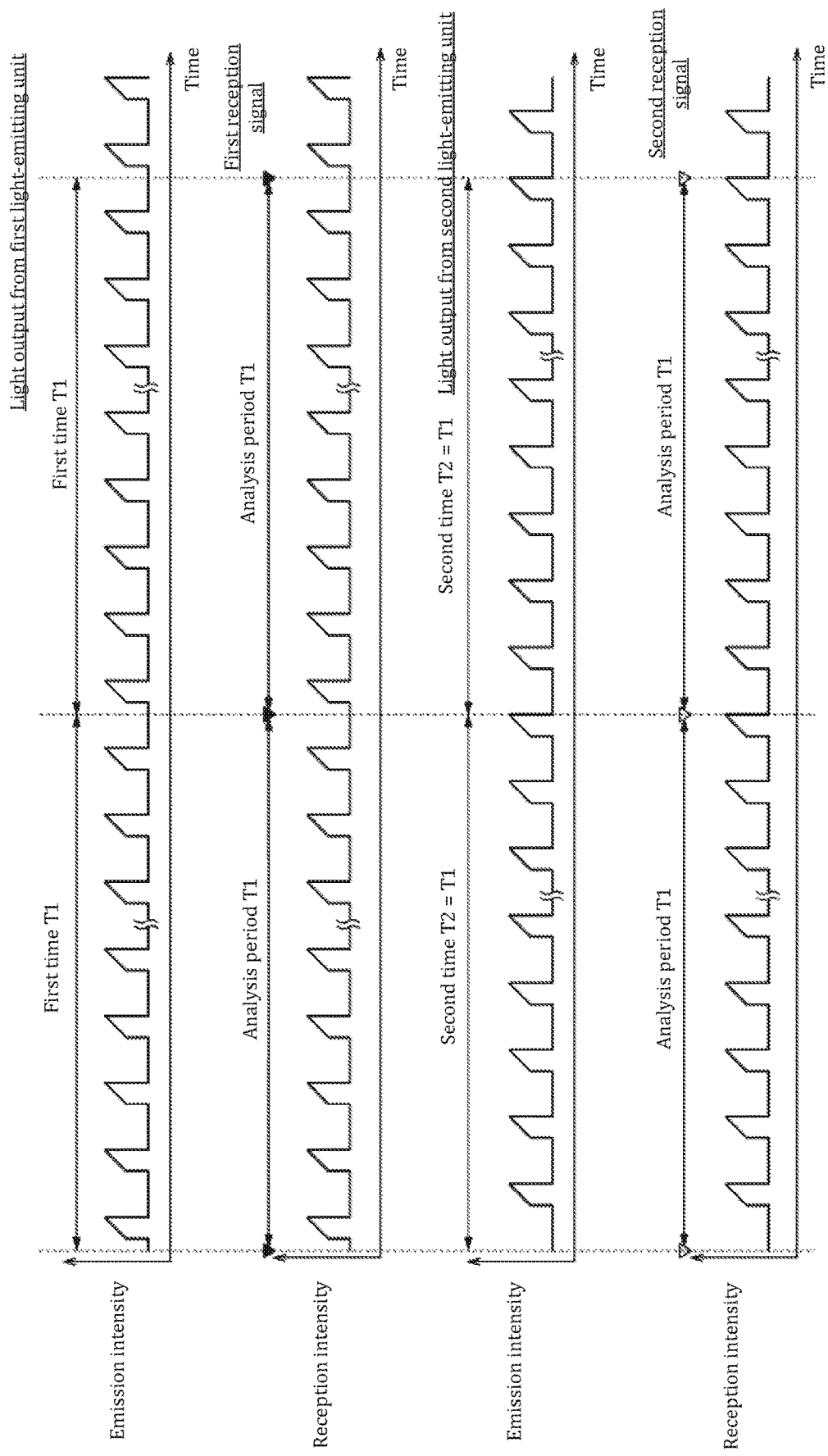
FIG. 5 is a schematic view illustrating one example of controls and processes executed by the control unit of a second embodiment.

FIG. 5 is a schematic view illustrating one example of controls and processes executed by the control unit 100 according to a second embodiment. FIG. 5 corresponds to FIG. 2. One example of the controls and processes by the spectrometry device 1 of the second embodiment is mainly described with reference to FIG. 5.

In the spectrometry device 1 according to the second embodiment, a content of the controls and processes by the control unit 100 differs from the first embodiment. Other configurations, functions, advantages, variations, and the like are similar to the first embodiment, and corresponding descriptions apply to the spectrometry device 1 of the second embodiment. Hereinbelow, constituent parts similar to the first embodiment are labeled with identical reference signs, and descriptions thereof are omitted. Points of difference from the first embodiment are mainly described.

As illustrated in the top graph and the graph that is third from the top in FIG. 5, the control unit 100—for example, the timing controller 10—controls the first switching unit 31 and the second switching unit 32, and the first irradiated light L1 and the second irradiated light L2 are alternately irradiated every one period (every one wavelength sweep) from the first light-emitting unit 41 and the second light-emitting unit 42. For example, the timing controller 10 turns on the first switching unit 31 and turns off the second switching unit 32, and the first irradiated light L1 is irradiated from the first light-emitting unit 41 for only one period. Next, the timing controller 10 turns on the second switching unit 32 and turns off the first switching unit 31, and the second irradiated light L2 is irradiated from the second light-emitting unit 42 for only one period. The wavelength sweeping time of the first irradiated light L1 and the wavelength sweeping time of the second irradiated light L2 may be mutually identical or mutually different.

As illustrated in the graph that is second from the top and the bottom graph in FIG. 5, the control unit 100—for example, the memory controller 70—respectively and alternately stores the information relating to the first reception signal S1 and the information relating to the second reception signal S2 in the first storage unit 81 and the second storage unit 82 every one period (for each data based on one wavelength sweep) in synchronization with the irradiation timings of the first irradiated light L1 and the second irradiated light L2. The memory controller 70 does not store the measurement data of the light-emitting unit that is not emitting light in the storage unit 80.

When a time elapsed from the previous execution of the analysis based on the information relating to the first reception signal S1 reaches the first time period T1, the CPU 90 acquires the information relating to the first optical spectrum O1 based on the information relating to the first reception signal S1 stored in the first storage unit 81 during the first time period T1. Likewise, when a time elapsed from the previous execution of the analysis based on the information relating to the second reception signal S2 reaches the second time period T2, the CPU 90 acquires the information relating to the second optical spectrum O2 based on the information relating to the second reception signal S2 stored in the second storage unit 82 during the second time period T2. The first time period T1 and the second time period T2 may be mutually identical or mutually different. In the one example illustrated in FIG. 5, the first time period T1 and the second time period T2 are identical. At this time, the analysis period of analyzing the first optical absorption spectrum of the first analysis-subject component C1 and the analysis period of analyzing the second optical absorption spectrum of the second analysis-subject component C2 are each T1 and are mutually identical.

Figure 6:
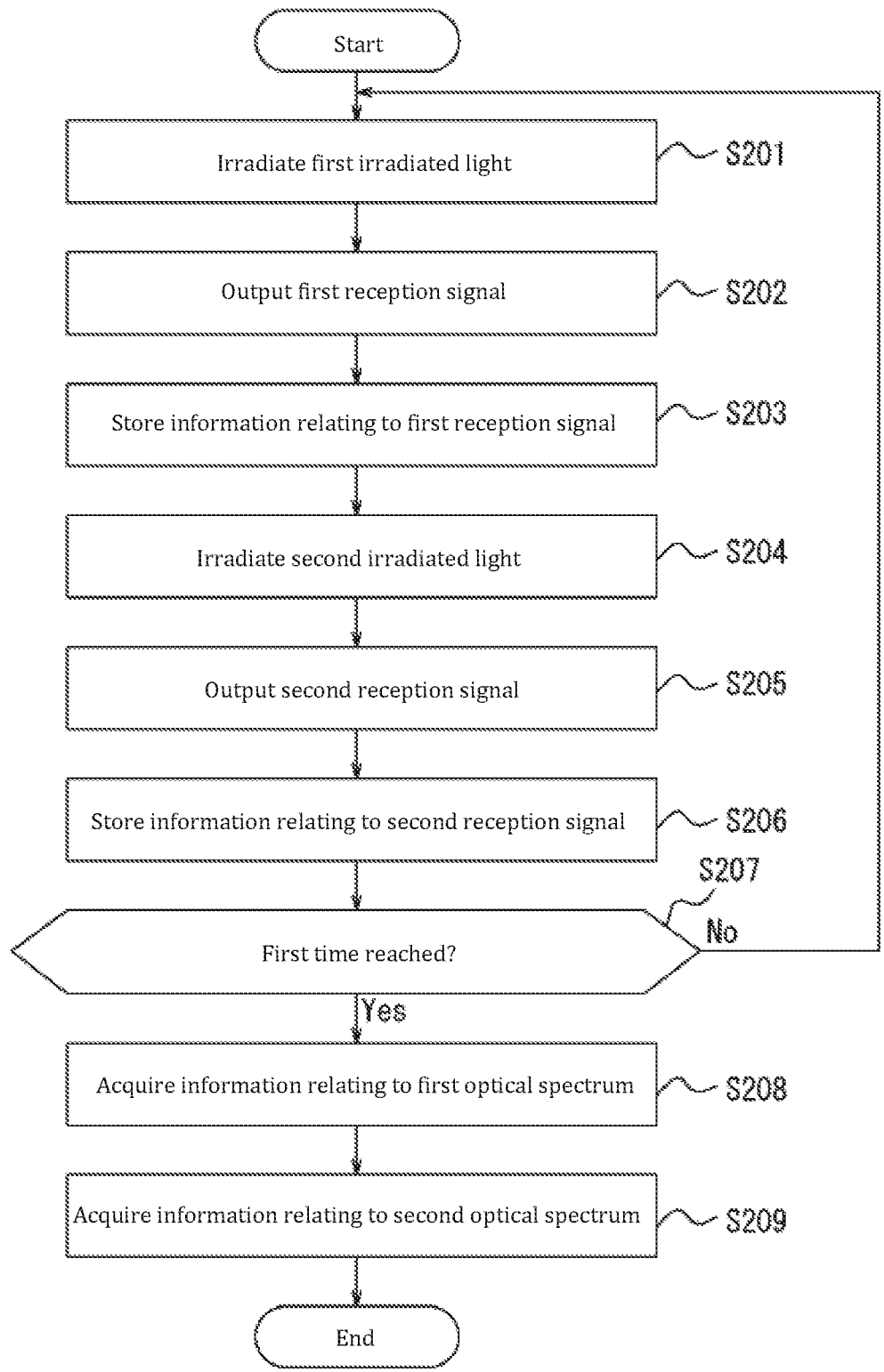
FIG. 6 is a flowchart illustrating one example of a spectrometry method using the spectrometry device of the second embodiment.

FIG. 6 is a flowchart illustrating one example of a spectrometry method using the spectrometry device 1 of the second embodiment. One example of a flow of spectrometry of the gas G to be measured executed by the spectrometry device 1 of the second embodiment is mainly described with reference to FIG. 6.

At step S201, the control unit 100—for example, the timing controller 10—causes the first irradiated light L1 to be irradiated from the first light-emitting unit 41 to the gas G to be measured.

At step S202, the first light-receiving unit 51 receives the first irradiated light L1 as the light to be measured permeating the gas G to be measured. The first light-receiving unit 51 outputs the first reception signal S1 that includes the information relating to the first optical spectrum O1 of the first analysis-subject component C1 in the gas G to be measured and is obtained based on the first irradiated light L1 irradiated at step S201.

At step S203, based on a control by the control unit 100—for example, the memory controller 70—the first storage unit 81 stores the information relating to the first reception signal S1 in synchronization with the irradiation timing of the first irradiated light L1.

At step S204, the control unit 100—for example, the timing controller 10—switches off the first switching unit 31 and switches on the second switching unit 32, and the second irradiated light L2 is irradiated from the second light-emitting unit 42 to the gas G to be measured at a timing different from the first irradiated light L1.

At step S205, the second light-receiving unit 52 receives the second irradiated light L2 as the light to be measured permeating the gas G to be measured. The second light-receiving unit 52 outputs the second reception signal S2 that includes the information relating to the second optical spectrum O2 of the second analysis-subject component C2 in the gas G to be measured and is obtained based on the second irradiated light L2 irradiated at step S204.

At step S206, based on a control by the control unit 100—for example, the memory controller 70—the second storage unit 82 stores the information relating to the second reception signal S2 at a timing different from the storage timing of the information relating to the first reception signal S1, in synchronization with the irradiation timing of the second irradiation light L2.

At step S207, the control unit 100—for example, the CPU 90—determines whether a time elapsed from the previous execution of the analyses based on the information relating to the first reception signal S1 and the information relating to the second reception signal S2 reaches the first time period T1 (=the second time period T2). When it is determined that the first time period T1 is reached, the control unit 100 executes a process of step S208. When it is determined that the first time period T1 is not reached, the control unit 100 executes the process of step S201.

At step S208, when it is determined that the first time period T1 is reached at step S207, the control unit 100—for example, the CPU 90—acquires the information relating to the first optical spectrum O1 based on the information relating to the first reception signal S1 stored in the first storage unit 81 during the first time period T1.

At step S209, when it is determined that the first time period T1 is reached at step S207, the control unit 100—for example, the CPU 90—acquires the information relating to the second optical spectrum O2 based on the information relating to the second reception signal S2 stored in the second storage unit 82 during the first time period T1.

According to a spectrometry device 1 of the second embodiment as described above, by causing the first light-emitting unit 41 and the second light-emitting unit 42 to alternately emit light every one period, temperature fluctuations arising in laser elements of the semiconductor lasers respectively included therein are reduced. For example, in the semiconductor lasers, self-heating occurs during emission, but self-heating does not occur in time domains when the injection currents are stopped, and temperatures of the laser elements gradually drop. When emission starts again, the temperatures of the laser elements begin to rise. The longer the times when the injection currents are stopped, the greater the temperature change amounts of the laser elements. Because laser-element temperature is closely related to emission wavelength, laser-element temperature changes affect spectrometry performance. In the spectrometry device 1 according to the second embodiment, the times when emission is stopped are short in both the first light-emitting unit 41 and the second light-emitting unit 42. As such, the temperature fluctuations in the laser elements are reduced. Moreover, in the spectrometry device 1 according to the second embodiment, the times when emission is stopped are uniform in time domain for both the first light-emitting unit 41 and the second light-emitting unit 42. As such, the temperature fluctuations of the laser elements in each emission period become uniform. Therefore, high-precision analysis can be realized. There may be a risk of arising even when the first light-emitting unit 41 and the second light-emitting unit 42 each have a temperature control mechanism for the laser element, and the above advantages are obtained even in a spectrometry device 1 having temperature control mechanisms.

By causing the first light-emitting unit 41 and the second light-emitting unit 42 to alternately emit light every one period, emission by each light-emitting unit becomes mutually uniform in time domain. Additionally, by making the analysis period of analyzing the first analysis-subject component C1 and the analysis period of analyzing the second analysis-subject component C2 identical as T1, analysis is enabled that suppresses an influence of process fluctuations between the information relating to the first reception signal S1 and the information relating to the second reception signal S2. For example, the spectrometry device 1 can acquire the information relating to the first reception signal S1 and the information relating to the second reception signal S2 under similar measurement conditions even when component concentrations of the gas G to be measured are fluctuating.

In the second embodiment above, the timing controller 10 is described as alternately irradiating the first irradiated light L1 and the second irradiated light L2 every one period, but the present invention is not limited thereto. The emission timings of the first light-emitting unit 41 and the second light-emitting unit 42 may be controlled by any method by the timing controller 10. For example, the timing controller 10 may alternately irradiate the first irradiated light L1 and the second irradiated light L2 every plurality of periods. For example, the timing controller 10 may alternately irradiate the first irradiated light L1 and the second irradiated light L2 every mutually identical number of wavelength sweeping or alternately irradiate the irradiated light every mutually different number of wavelength sweeping.

It is obvious to a person skilled in the art that the present invention can be realized in other predetermined forms other than the embodiments above without departing from the spirit or essential features thereof. Therefore, the description above is illustrative and not limited thereto. The scope of the present invention is defined not by the description above but by the included claims. Among all variations, several variations within a scope of equivalence thereto are included therein.

For example, the disposition, the number, and the like of each constituent part above are not limited to the description above and the content of the illustrations in the drawings. The disposition, the number, and the like of each constituent part may be configured in any manner as long as the functions thereof can be realized.

For example, each step, each function included in the steps, and the like in the above spectrometry method using the spectrometry device 1 according to one or more embodiments can be rearranged in a logically consistent manner; an order of the steps can be changed, and a plurality of steps can be combined into one or divided.

For example, the present invention can also be realized as a program describing processing contents that realize each function of the spectrometry device 1 according to one or more embodiments or a storage medium recording the program. It should be understood that the scope of the present invention also includes such.

Figure 7:
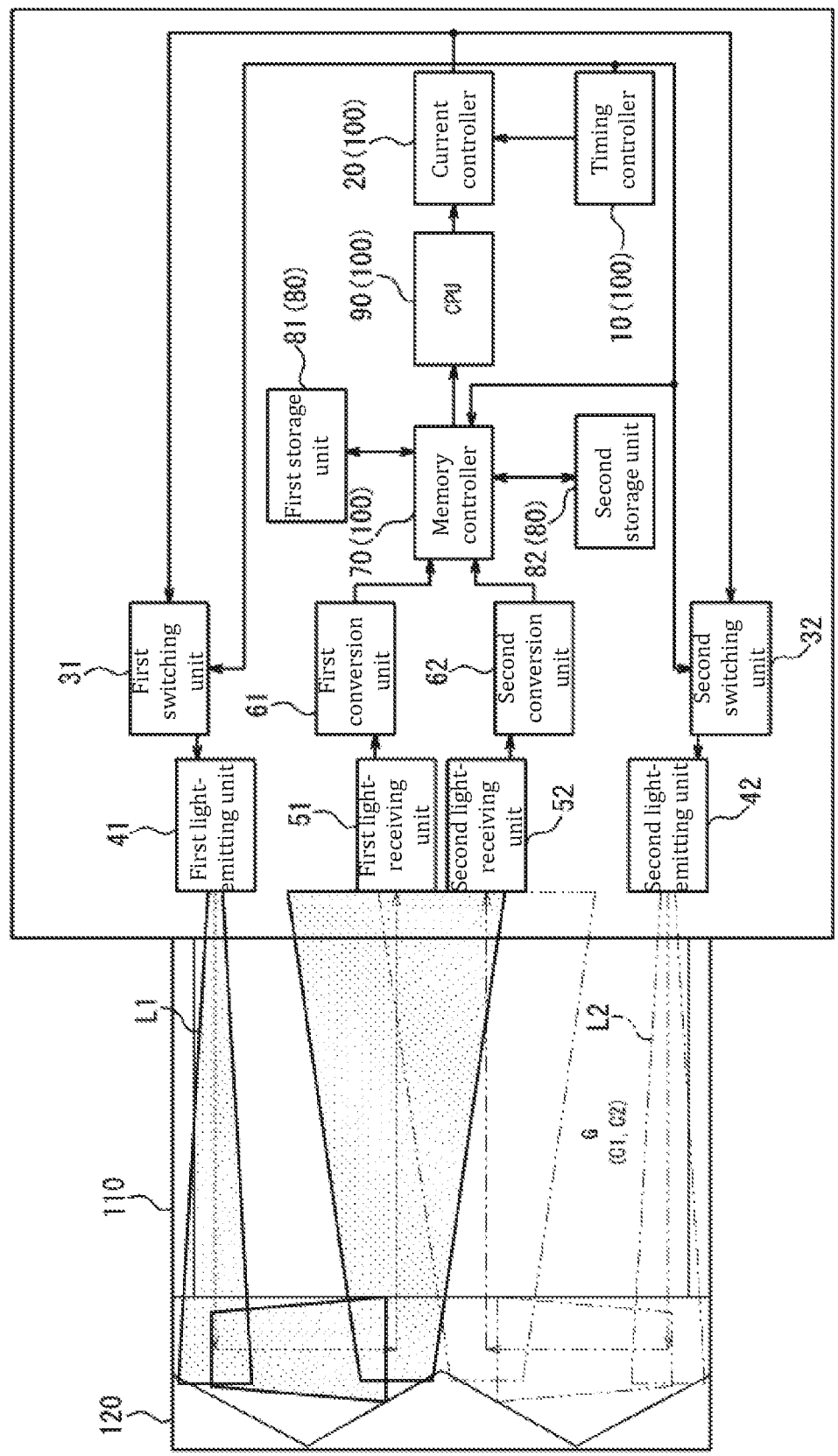
FIG. 7 is a block diagram illustrating a variation of the configuration of the spectrometry devices of the first embodiment and the second embodiment.

FIG. 7 is a block diagram illustrating a variation of the configuration of the spectrometry device 1 of the first embodiment and the second embodiment. In the spectrometry device 1 of the first embodiment and the second embodiment described above, the first light-emitting unit 41 and the second light-emitting unit 42 are described as being disposed respectively opposite to the first light-receiving unit 51 and the second light-receiving unit 52 with the gas G to be measured interposed therebetween. Not being limited thereto, the first light-emitting unit 41 and the second light-emitting unit 42 may be disposed on the same side as the first light-receiving unit 51 and the second light-receiving unit 52.

For example, the spectrometry device 1 may further have a probe unit 110 that extends along optical axes of the first irradiated light L1 and the second irradiated light L2 to be superimposed with the gas G to be measured and a reflecting unit 120 positioned at a tip of the probe unit 110 to be opposite to the first light-emitting unit 41 and the second light-emitting unit 42 with the gas G to be measured interposed therebetween. At this time, the first light-receiving unit 51 and the second light-receiving unit 52 are disposed on the same side as the first light-emitting unit 41 and the second light-emitting unit 42 to be opposite to the reflecting unit 120 with the gas G to be measured interposed therebetween.

In a spectrometry device 1 as illustrated in FIG. 7, it is also conceivable to perform emission upon enlarging beam diameters of the first irradiated light L1 and the second irradiated light L2 to reduce an influence caused by deflection such as vibrations of the probe unit 110 on the measurement. Even in such a situation, the spectrometry device 1 can suppress simultaneous reception of the light to be measured based on each irradiated light by the first light-receiving unit 51 and the second light-receiving unit 52 to more remarkably improve analysis precision. That is, the spectrometry device 1 more remarkably exhibits the advantages described above.

A spectrometry device 1 as illustrated in FIG. 7 may integrally have the reflecting unit 120 via the probe unit 110. Alternatively, the spectrometry device 1 may not have the probe unit 110 and have the reflecting unit 120 as a separate body.

In the above embodiments, the description is limited to a TDLAS, but the spectrometry device 1 can be applied to any analyzer that performs spectrometry of any analysis subject based on repeated sweeping signals.

In the above embodiments, the optical spectra are described as including optical absorption spectra, but the present invention is not limited thereto. The spectrometry device 1 may analyze the analysis-subject components using any spectroscopic method, in addition to such absorption spectroscopy. The spectroscopic method may include, for example, fluorescence spectroscopy and Raman spectroscopy. For example, in fluorescence spectroscopy, the optical spectra include fluorescence spectra. For example, in Raman spectroscopy, the optical spectra include Raman spectra.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

1 Spectrometry device
10 Timing controller
20 Current controller
31 First switching unit
32 Second switching unit
41 First light-emitting unit
42 Second light-emitting unit
51 First light-receiving unit
52 Second light-receiving unit 61 First conversion unit
62 Second conversion unit
70 Memory controller
80 Storage unit
81 First storage unit
82 Second storage unit
90 CPU
100 Control unit
110 Probe unit
120 Reflecting unit
C1 First analysis-subject component
C2 Second analysis-subject component
G Gas to be measured
L1 First irradiated light
L2 Second irradiated light
O1 First optical spectrum
O2 Second optical spectrum
S1 First reception signal
S2 Second reception signal
T1 First time period
T2 Second time period

What is claimed is:

1. A spectrometry device comprising:
a controller;
a first light emitter that irradiates first irradiated light to gas to be measured;
a second light emitter that irradiates second irradiated light to the gas to be measured;
a first light receiver that outputs a first light reception signal that comprises information relating to a first optical spectrum of a first analysis-subject component in the gas to be measured and is obtained based on the first irradiated light;
a second light receiver that outputs a second light reception signal that comprises information relating to a second optical spectrum of a second analysis-subject component in the gas to be measured and is obtained based on the second irradiated light; and
a storage that stores first information relating to the first light reception signal and second information relating to the second light reception signal, wherein
the controller:
causes the first irradiated light and the second irradiated light to be alternately irradiated every one period corresponding to one wavelength sweep from the first light emitter and the second light emitter at mutually different timings during a first time period;
alternately stores the first information and the second information in the storage every one period corresponding to one wavelength sweep at mutually different timings during the first time period, in synchronization with irradiation timings of the first irradiated light and the second irradiated light;
acquires the information relating to the first optical spectrum based on the first information stored in the storage after the first time period has passed; and
acquires the information relating to the second optical spectrum based on the second information stored in the storage after the first time period has passed.

2. The spectrometry device according to claim 1, wherein the controller:
consecutively stores a plurality of pieces of first information relating to the first light reception signal in the storage during the first time period; and
consecutively stores a plurality of pieces of second information relating to the second light reception signal in the storage during a second time period that follows the first time period.

3. The spectrometry device according to claim 2, wherein
the first light emitter and the second light emitter are disposed opposite to the first light receiver and the second light receiver, respectively,
the gas to be measured is interposed between the first light emitter and the first light receiver, and
the gas to be measured is interposed between the second light emitter and the second light receiver.

4. The spectrometry device according to claim 2, further comprising:
a probe that extends along optical axes of the first irradiated light and the second irradiated light to be superimposed with the gas to be measured; and
a reflector positioned at a tip of the probe to be opposite to the first light emitter and the second light emitter, wherein
the gas to be measured is interposed between the reflector and each of the first light emitter and the second light emitter,
the first light receiver and the second light receiver are disposed on a same side as the first light emitter and the second light emitter to be opposite to the reflector,
the gas to be measured is interposed between the reflector and each of the first light receiver and the second light receiver.

5. The spectrometry device according to claim 1, wherein
the controller alternately stores the first information and the second information in the storage every one period.

6. The spectrometry device according to claim 5, wherein
the first light emitter and the second light emitter are disposed opposite to the first light receiver and the second light receiver, respectively,
the gas to be measured is interposed between the first light emitter and the first light receiver, and
the gas to be measured is interposed between the second light emitter and the second light receiver.

7. The spectrometry device according to claim 5, further comprising:
a probe that extends along optical axes of the first irradiated light and the second irradiated light to be superimposed with the gas to be measured; and
a reflector positioned at a tip of the probe to be opposite to the first light emitter and the second light emitter, wherein
the gas to be measured is interposed between the reflector and each of the first light emitter and the second light emitter,
the first light receiver and the second light receiver are disposed on a same side as the first light emitter and the second light emitter to be opposite to the reflector,
the gas to be measured is interposed between the reflector and each of the first light receiver and the second light receiver.

8. The spectrometry device according to claim 1, wherein
the first light emitter and the second light emitter are disposed opposite to the first light receiver and the second light receiver, respectively,
the gas to be measured is interposed between the first light emitter and the first light receiver, and
the gas to be measured is interposed between the second light emitter and the second light receiver.

9. The spectrometry device according to claim 1, further comprising:

a probe that extends along optical axes of the first irradiated light and the second irradiated light to be superimposed with the gas to be measured; and a reflector positioned at a tip of the probe to be opposite to the first light emitter and the second light emitter, wherein the gas to be measured is interposed between the reflector and each of the first light emitter and the second light emitter, the first light receiver and the second light receiver are disposed on a same side as the first light emitter and the second light emitter to be opposite to the reflector, the gas to be measured is interposed between the reflector and each of the first light receiver and the second light receiver.

10. A spectrometry method comprising:

causing first irradiated light and second irradiated light to be alternately irradiated every one period corresponding to one wavelength sweep at mutually different timings during a first time period, wherein the first irradiated light and the second irradiated light are irradiated to gas to be measured;

outputting a first light reception signal that comprises information relating to a first optical spectrum of a first analysis-subject component in the gas to be measured and is obtained based on the first irradiated light;

outputting a second light reception signal that comprises information relating to a second optical spectrum of a second analysis-subject component in the gas to be measured and is obtained based on the second irradiated light;

alternately storing, in a storage, first information relating to the first light reception signal and second information relating to the second light reception signal every one period corresponding to one wavelength sweep at mutually different timings during the first time period, wherein the first information and the second information are stored in synchronization with irradiation timings of the first irradiated light and the second irradiated light, respectively;

acquiring the information relating to the first optical spectrum based on the first information stored in the storage after the first time period has passed; and acquiring the information relating to the second optical spectrum based on the second information stored in the storage after the first time period has passed.

* * * * *